Feb. 27, 1945.   E. R. SANDMEYER   2,370,262
FRUIT AND VEGETABLE SORTING MACHINE
Filed July 23, 1943   3 Sheets-Sheet 1

INVENTOR.
Ernest Raphael Sandmeyer,
BY
Munn, Liddy & Glaccum
ATTORNEYS

Feb. 27, 1945.　　　　E. R. SANDMEYER　　　　2,370,262
FRUIT AND VEGETABLE SORTING MACHINE
Filed July 23, 1943　　　3 Sheets-Sheet 2
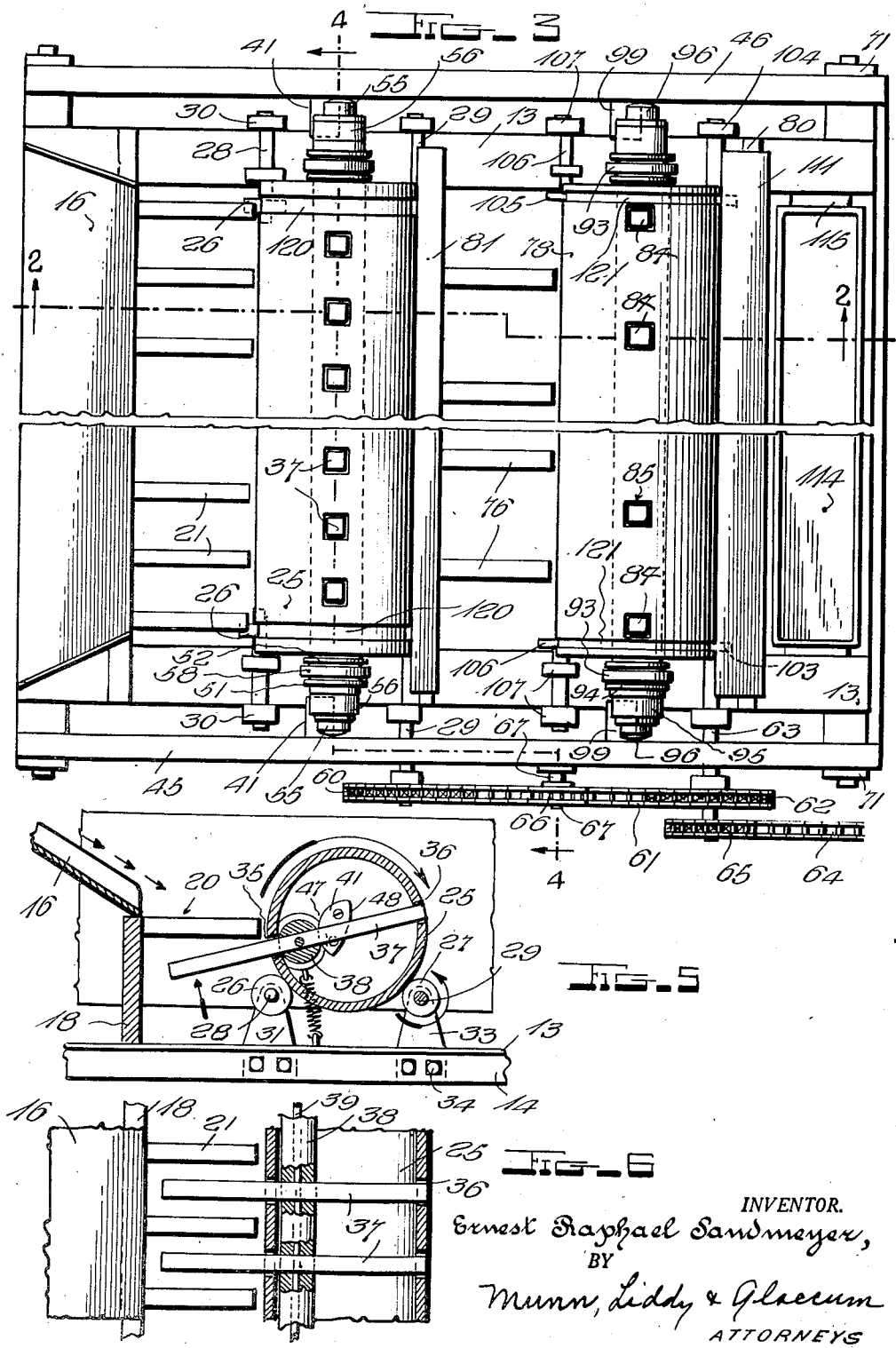
INVENTOR.
Ernest Raphael Sandmeyer,
BY
Munn, Liddy & Glaccum
ATTORNEYS

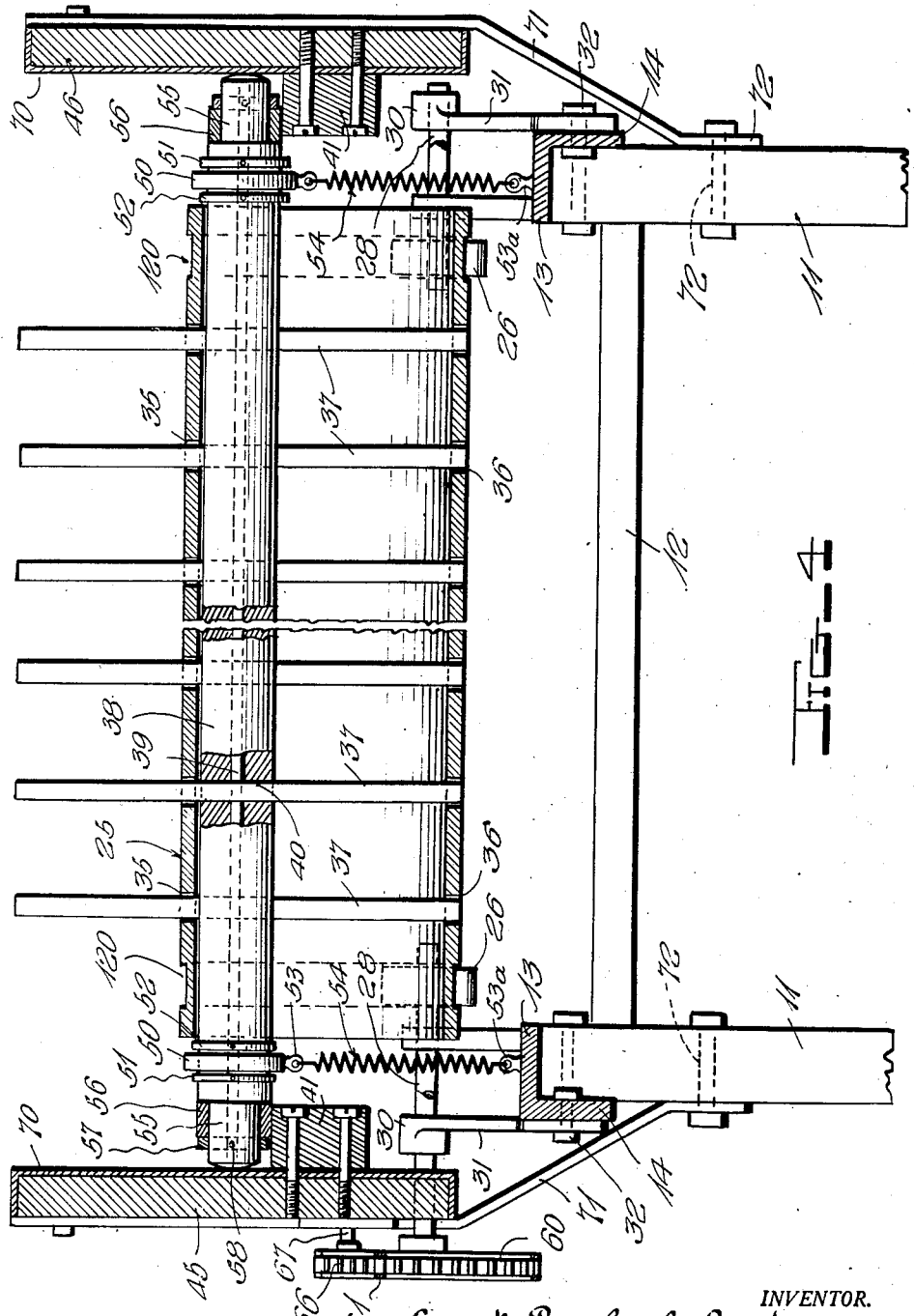

Patented Feb. 27, 1945

2,370,262

UNITED STATES PATENT OFFICE 2,370,262

FRUIT AND VEGETABLE SORTING MACHINE

Ernest Raphael Sandmeyer, Yakima, Wash., assignor to Fruit Packers Supply & Equipment Company, Yakima, Wash., a corporation of Washington Application July 23, 1943, Serial No. 495,883

9 Claims. (Cl. 209—97)

This invention relates to a fruit and vegetable sorter.

An object of the invention is the provision of a device for sorting fruits or vegetables in such a manner that the same will be handled gently and thus eliminate bruises.

Another object of the invention is the provision of a machine for sorting fruits and vegetables in accordance with the sizes, in which the unassorted fruits and vegetables which remain on a grid are picked up gently and carried to a second sorting device for further separation of the remaining fruits or vegetables according to predetermined sizes.

A further object of the invention is the provision of a machine for accurately sorting fruits or vegetables according to the size, whether the materials sorted are substantially round in shape or have variations in the shape, the separation into various sizes being accomplished even though the fruits or vegetables are provided with stems.

A still further object of the invention is the provision of a machine having a grid upon which fruits or vegetables are fed with a rotary member having movable fingers that will pick up those fruits and vegetables that remain on the grid and carry them to a second grid for further separation into sizes, said fingers being automatically moved out of the way of the periphery of the rotable member when the fruits or vegetables are being discharged on to a second separator.

This invention will be best understood from a consideration of the following detailed description, in view of the accompanying drawings forming a part of the specification, nevertheless, it is to be understood that the invention is not confined to the disclosure, being susceptible of such changes and modifications as define no material departure from the salient features of the invention as expressed in the appended claims.

In the drawings:

Fig. 3 is a top plan view of the machine.

Fig. 4 is a transverse vertical section taken along the line 4—4 of Fig. 3.

Fig. 5 is a fragmentary vertical section similar to that shown in Fig. 2 of one separator in position, showing the lifting fingers about to be elevated through a stationary grid.

Fig. 6 is a fragmentary plan view partly in section of Fig. 5.

Referring more particularly to the drawings, 10 designates a base member from which rise a plurality of spaced pairs of standards or posts 11. These posts are secured to the base member in any approved manner. The upper ends of the posts are connected together by means of rods or bars 12 for the purpose of stability.

Figure 1:
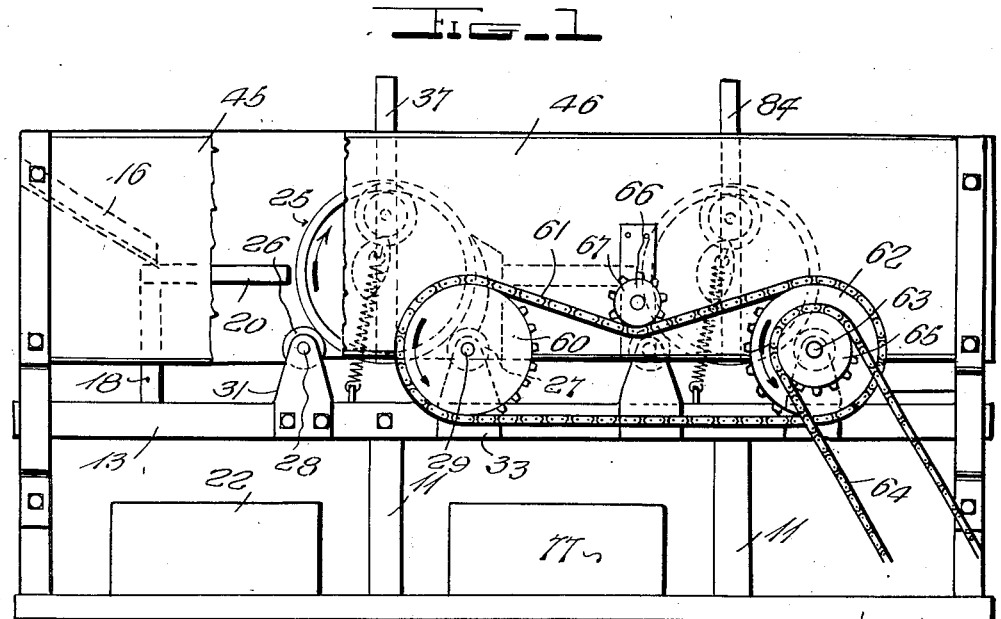
Fig. 1 is a side view in elevation of a machine constructed according to the principles of my invention.
Figure 2:
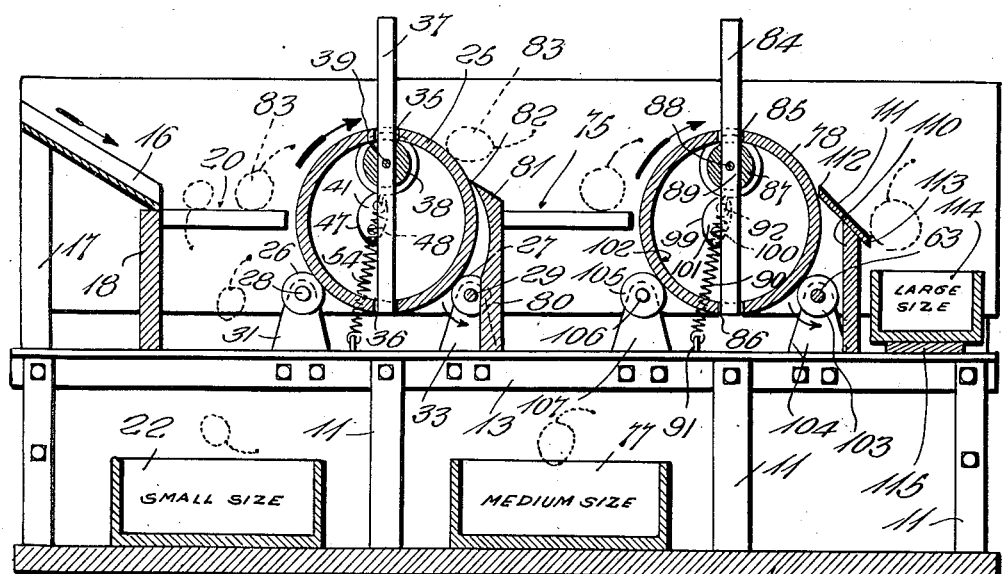
Fig. 2 is a longitudinal vertical section taken along the line 2—2 of Fig. 3.

An angle iron 13 is bolted to each of the upper ends of each series of posts at one side of the base member 10 and each angle iron has a flange 14 in a vertical position for engaging the outer faces of the posts while the other flange 15 rests upon the tops of the posts as shown more particularly in Figs. 2 and 4. These angle irons run in parallel relation and extend longitudinally of the machine and provide the main support for the various elements.

A feeding chute 16 is located at the front end of the machine and is inclined downwardly and supported by posts 17 and a plate 18. The posts and the plate are mounted in any approved manner on the angle irons 13.

Extending forwardly of the inner end of the chute 16 is a grid generally designated by the numeral 20. This grid is composed of a plurality of forwardly extending bars 21 which are spaced a predetermined distance apart and which have one end secured to the plate 18 adjacent the inner end of the chute 16. The bars 21 are located in parallel relation and in a horizontal plane, and spaced a distance apart which will permit the smallest size of the fruits or vegetables to pass there between and drop into a container 22, supported by the base member 10, and extending transversely of the machine. In other words, the container 22 is of sufficient length that it will be disposed beneath all of the parallel bars 21 which form the grid 20, so that the fruits or vegetables will be directed into said container.

A cylinder generally designated by the numeral 25 is supported by a series of rollers 26 and 27. The rollers 26 are mounted on stub shafts 28, while rollers 27 are secured to a shaft 29. The shafts 28 are mounted in bearings 30, carried by the upper ends of brackets 31, which are secured to the flanges 14 and 15 of the angle irons 13. The brackets are secured by means of bolts or rivets 32.

The shaft 29 is likewise carried by bearings at the upper ends of brackets 33 which are bolted at 34 to the depending flanges 14 of the angle irons 13. The rollers 27 not only cooperate with the rollers 26 for supporting the cylinder 25, but since the shaft 29 is driven to which the rollers 27 are attached said rollers will likewise be driven for revolving the cylinder 25 in the direction indicated by the arrows in Figs. 2 and 5.

It will be noted from Figs. 2, 3 and 4, that the cylinder is provided with a plurality of diametrically disposed openings 35 and 36, and each pair of diametrically disposed openings receives a slidably mounted finger 37. When the cylinder is revolved these fingers will be revolved simultaneously and will be moved upwardly between the bars 21 of the grid 20 for raising fruits or vegetables which have failed to pass through the spaces between the said bars.

A sleeve 38 is located within the cylinder 25 and has a centrally disposed shaft 39 which passes through openings in each of the fingers 37 at approximate central points of the fingers. The fingers are also inserted through diametrically disposed passages 40 in the sleeve 38.

It is to be noted that the sleeve 38 will contact the inner surface of the cylinder 25 for a portion of the length of said surface, and it will be guided in its movements by cams 41. These cams, as shown more particularly in Fig. 4, are located exteriorly of the cylinder 25 and are bolted or secured in any approved manner to walls 45 and 46, located at each side of the machine and extending the full length thereof, as shown in Fig. 3. Each cam has a curved surface 47 which is substantially concentric with respect to the inner curved surface of the cylinder 25. Opposed to the curved surface is another curved surface 48 which is drawn along a greater radius than the curved surface 47 of the cam, so that it is substantially flat.

A ring 50 is loosely mounted on each outer end of the sleeve 38 and is held in place by a pair of collars 51 and 52, which are pinned to the sleeve with the ring 50 being located between the pair of collars. This ring is provided with a depending eye 53 to which is connected the upper end of a coiled spring 54. This coil spring extends downwardly and is connected to an eye 53ª, secured to each of the horizontal flanges 15 of the angle irons 13. In other words, a spring 54 is located at each side of the cylinder 25, so that an even pull will be provided at the opposite ends of the sleeve, tending to pull the sleeve downwardly toward the bottom of the cylinder.

The outer ends of the sleeve 38 are reduced as shown at 55, and a roller 56 is mounted on each reduced end. The collar 57 pinned at 58 to the reduced end 55 maintains each roller in position. The rollers 56 will ride upon the curved surface 47 and 48 of the cams 41.

The rollers 27 are driven by the shaft 29 which in turn is driven by a sprocket 60 secured to the said shaft. This sprocket is driven by a chain 61, which in turn is driven by a sprocket 62 secured to a shaft 63. A chain 64 drives a sprocket 65, likewise secured to the shaft 63, and the last-mentioned chain is driven by a motor which may be supported by the frame or may be supported independently of the frame. An idling sprocket 66 is adjustably mounted on a stub shaft 67 and engages the chain 61 for maintaining the chain taut. The sprocket 66 is adjustable vertically on the wall 45.

The walls 45 and 46 are provided with wear plates 70 which are engaged by the ends of the sleeve or hollow rod 38 for maintaining the sleeve in such position that the opposite ends of the fingers 37 will always move midway between the spaced bars 21 of the grid 20. These walls are supported by brackets 71 which are bolted at 72 to the posts 11. The brackets, as shown in Fig. 4, are vertical where they are connected to the walls 45 and 46, but they extend inwardly and then downwardly as shown at 72 where they are connected to the posts.

While the chains and sprockets are shown at one side of the wall 45, nevertheless, similar chains and sprockets may be located on the outside of the wall 46 in similar position to the chains and sprockets adjacent the wall 45.

A second stationary grid 75 is composed of bars 76 located in a horizontal plane and spaced a distance apart, which is greater than the distance of the spacing of the bars 21 of the grid 20. These bars will permit those articles of a certain size which have been removed from the grid 20 to pass between the bars and drop into a transversely disposed container 77, which is located directly below the grid 75. All of the articles which do not pass between the bars 76 will be picked up and carried over a second cylinder 78 in a manner which will be presently explained.

A plate 80 is secured transversely of the frame, and is secured in any approved manner to the angle irons 13, supported upon the tops of the posts 11. The upper edge of this plate is bevelled as shown at 81 with a reduced edge 82 located close to the outer periphery of the cylinder 25 so that when the articles indicated by the numeral 83 are carried over the dead center of the cylinder 25 by the fingers 37 said articles will be directed to the grid 75. This grid disposes of the articles of an intermediate size while retaining the largest size thereon.

The cylinder 78 is similar in all respects to the cylinder 25 and is provided with diametrically disposed pairs of openings 85 and 86, through which pairs of fingers 84 are adapted to be moved.

The fingers 84 are attached to a hollow rod or sleeve 87 by means of a pin or rod 88, extending entirely through the sleeve with the fingers being received by diametrically disposed passages 89. It will be noted that the pin 88, as does the pin or rod 39, passes through the centers of the respective fingers 84.

A spring 90 at each side of the frame is connected to an eye 91, carried by the angle irons 13. This spring is also attached to an eye 92, depending from a ring 93 mounted on each outer end of the sleeve 87. Collars 94 maintain the ring in position. The outer reduced ends of the sleeve 87 are in engagement with the wear plates 70 of walls 45 and 46. A roller 95 is mounted on each reduced end 96 of the sleeve 87 and these rollers are adapted to ride over the two opposite surfaces 99 and 100 of the cams 101. The surface 99 of the cams will maintain the sleeve 87 in contact with an inner surface 102 of the cylinder 78 when the opposite ends of the fingers 84 alternately are moved through the bars 76 of the stationary grid 75.

The cylinder 78 is revolved by rollers 103 secured to the shaft 63 and this shaft in turn is carried by bearings at the upper ends of brackets 104. The second pair of rollers 105 are secured to stub shafts 106 which are supported by bearings mounted on the upper ends of brackets 107. Brackets 104 and 107 are secured to the angle irons 13.

A vertically disposed plate 110 is fixed to the angle irons 13 adjacent the cylinder 78. An inclined plate 111 is secured to the upper bevelled end of the plate 110 and one edge 112 of this plate is likewise bevelled and disposed adjacent the outer surface of the cylinder 78. The other edge 113 of the plate 111 extends along the top of an open ended container 114 which is adapted to receive articles of the larger size which have been removed from the stationary grid 75 by the moving fingers 84. The container 114 is supported by a bar 115 which is secured to and extends over the horizontal fingers of the angle irons 13.

The operation of my device is as follows:

The device described herein is for the purpose of sorting fruits or vegetables according to size. It is to be borne in mind that wherever the word article is employed in the specification and claims that it is intended to mean a fruit or a vegetable.

The articles are poured on to the chute 16 whence they will fall upon the grid 20. All articles of a minimum size will pass between the bars 21 and drop into the container 22.

With the machine operating the projecting ends of the fingers 37 will be moved toward the grid 20 as shown in Fig. 5, with the opposite ends of the fingers being disposed within the openings 36 in the cylinder 25. At this time the cylinder is being revolved by the driven rollers 27 and supported not only by these rollers but by the rollers 26. It will be noted at this time that the sleeve or hollow rod 38 is in engagement with the curved surface 47 of the cams 41, whereby the sleeve will be maintained in contact with the inner wall of the cylinder while the projecting ends of the fingers are moved towards the grid 20 while said ends are moved through the grid and while the projecting ends of the fingers 37 are carrying the articles upwardly and over the cylinder 25.

The spacing of the fingers 37 is substantially the same as the bars 21, so that they will raise all articles which have failed to pass between the bars 21. When the sleeve 38 and the projecting ends of the fingers reach the position shown in Fig. 2 said sleeve is ready to pass over the upper ends of the cams 41, and the fingers are moved approximately dead center of the revolving cylinder 25. At this point, however, the articles as shown are rolling down the curved outer surface of the cylinder 25 toward the grid 75.

As the sleeve 38 passes beyond the dead center it will slip off the upper ends of the cams and due to the action of the springs 54 the sleeve will be pulled down rapidly with the rollers 56 riding on the slightly curved surface 48 of the cams. When this happens the opposite ends of the fingers are rapidly projected beyond the cylinder 25 and the ends of the fingers which have just passed through the grid 20 are moved within the opening 35. The sliding movement of the fingers 37 permits the opposite ends of said fingers alternately to pass through the grid 20 and thus increase the capacity of the machine. In other words, the articles are lifted when diametrically opposite points of the cylinder 25 are alined with the horizontal position of the stationary grid 20. Furthermore, the inward movement of the opposite ends of the fingers also permits the addition of other units to the machine. When the sleeve 38 slips over the upper edges of the cams 41 the projecting ends of the fingers will have a retrograde movement and the free ends of the said fingers will be entirely received within the cylinder whereby said ends will clear the member 81. Furthermore, the inner position of the projecting ends of the fingers, after they pass the upper dead center of the moving cylinder, will prevent fruits or vegetables which have been deposited upon the stationary grid 75 from being crushed if the fingers were extended during the complete rotation of the cylinder.

All fruits and vegetables which have been discharged upon the stationary grid 75 are graded because the medium size articles will pass between the bars 76 of the grid 75 while the largest sizes of the articles will be retained thereon.

The rotating cylinder 78 is substantially identical in construction with the cylinder 25 and its connected elements are also substantially identical except that the fingers 84 are spaced a greater distance apart than the fingers 37. The spacing of the fingers 84 is such that they will pass centrally through the bars 76 of the stationary grid 75, with the spacing of the fingers 84 being the same as the spacing of the bars 76. In this way, the fingers 84 passing through the bars 76 will elevate the largest size of the articles and raise them over the top of the cylinder 78. When the fingers 84 reach substantially the vertical position the articles will roll off the curved surface of the cylinder 78 and be discharged upon the inclined plate 111 whence they will be deposited in the container 114.

The sleeve 87 will be maintained in contact with the inner wall of the cylinder 78 while the projecting ends of the fingers are moving upwardly towards the grid 75, thence through said grid until they reach the vertical position shown in Fig. 2. When the sleeve 87 slips beyond the upper edges of the cams 101 the springs 90, which are under tension and which are pulling on the sleeve 87, will cause said sleeve to descend over the curved surfaces 100 of the cams 101 until the sleeve reaches the bottom of the cylinder 78. At this time, the formerly projecting ends of the fingers 84 will be neatly housed within the openings 85 in the cylinder 78, while the opposite ends of the fingers will be projected and are beginning their upper ascent toward the grid 75 for carrying away further articles which have been deposited upon said grid by the fingers 37 of the cylinder 25.

The wear plates 70 maintain the sleeve 38 and the fingers 37 always in the proper position. The grooves 120 in the ends of the cylinder 25 and the grooves 121 in the ends of the cylinder 78 receive the respective pairs of rollers 26—27 and 105—103 for maintaining said cylinder in proper position at all times, so that when the fingers are moved through their respective grids they will always pass through the central portions of the spaces between the bars of the grids.

The shafts 29 and 63 extend transversely of the machine while the shafts 28 and 106 are stub shafts supported by the various brackets. These stub shafts permit a free space between the respective idling rollers 26 and 105 for the upward movement of the fingers 37. However, since the projected ends of the fingers 37 and 84 are always withdrawn within the cylinders 25 and 78, respectively, after said fingers pass the upper dead center, said fingers will be out of the way of the transverse shafts 29 and 63.

It will be appreciated that while I have shown two cylinders 25 and 78, any number of the cylinders may be employed for increasing the grading of the articles. On the other hand, the selected grading may be limited to two sizes so that it will only be necessary to employ one cylinder.

The machine will continuously grade the fruits and vegetables while gently handling the materials to be grated, thereby eliminating injury or bruising of the fruits or vegetables because the articles are always lifted gently from the grading grids and are then allowed to roll normally from the cylinders on to a succeeding grid or into a container.

While the machine has been described particularly as adapted for sorting fruits, nevertheless, it will be appreciated that this machine may separate materials of various kinds, according to size or substance. Materials to be separated are either fed directly to the grid generally designated by the numeral 20 or the machine may be so placed that the materials will flow to the cylinder 25 without the use of the grid.

When the machine is used to remove articles or materials from a flowing substance the cylinder may be in the form of a screen so that liquids will pass through the cylinder transversely thereof while the projected moving fingers will lift the materials to be separated from the flowing substance until they reach the highest point in the travel of the cylinder and where the fingers 37 are shown in a vertical position. When the sleeve 38 passes beyond the cam member 41 the projected ends of the fingers will be retracted and thus release the materials to the surface of the cylinder whence they are removed by the member 81.

When the machine is used in connection with liquids it may be employed for removing trash from the waters of irrigation canals, and as a screen to prevent game fish from entering said canals, at the same time removing trash which flows against such a screen.

The machine may also be employed for removing detritus from flowing water.

On the other hand, the device may also be used in removing undesirable matter in a sand washing flume, or for removing sticks or larger particles from sawdust at sawmills.

While the fingers 37 and 87 are shown square in cross section it will be appreciated that these fingers may be round or have any other cross-sectional area.

I claim:

1. A sorting machine comprising a stationary grid, means feeding articles of various sizes to the grid which will release articles of minimum size, a cylinder having diametrically disposed openings in the walls thereof, a finger slidably mounted in each pair of diametrically disposed openings, a sleeve freely movable in the cylinder, means connecting an intermediate portion of each finger to the sleeve so that the fingers will move simultaneously, means connected with the sleeve for compelling said sleeve and fingers to be moved in one direction for projecting alternately the opposite ends of the fingers from the cylinder, means rotating the cylinder so that the projecting ends of the fingers will pass through the grid and lift the unreleased articles over the cylinder to a discharge point.

2. A sorting machine comprising a stationary grid, means feeding articles of various sizes to the grid which will release articles of minimum size, a cylinder having diametrically disposed openings in the walls thereof, a finger slidably mounted in each pair of diametrically disposed openings, a sleeve freely movable in the cylinder, means connecting an intermediate portion of each finger to the sleeve so that the fingers will move simultaneously, means connected with the sleeve for compelling said sleeve and fingers to be moved in one direction for projecting alternately the opposite ends of the fingers from the cylinder, means rotating the cylinder so that the projecting ends of the fingers will pass through the grid and lift the unreleased articles over the cylinder to a discharge point, and means retaining the projected ends of the fingers extended when said fingers are passing through the grid and carrying the articles over the cylinder to approximately the discharge point.

3. A sorting machine comprising a stationary grid, means feeding articles of various sizes to the grid which will release articles of minimum size, a cylinder having diametrically disposed openings in the walls thereof, a finger slidably mounted in each pair of diametrically disposed openings, a sleeve freely movable in the cylinder, means connecting an intermediate portion of each finger to the sleeve so that the fingers will move simultaneously, means connected with the sleeve for compelling said sleeve and fingers to be moved in one direction for projecting one end of each finger from the cylinder, means rotating the cylinder so that the projecting ends of the fingers will pass through the grid and lift the unreleased articles over the cylinder to a discharge point, and stationary cams engageable with the ends of the sleeve and forcing said sleeve to contact the inner wall of the cylinder for projecting the other end of each finger from said cylinder, the ends of said fingers when projected passing through the grid and carrying the articles over the cylinder to a point just past dead center.

4. A sorting machine comprising a stationary grid, means feeding articles of various sizes to the grid which will release articles of minimum size, a cylinder having diametrically disposed openings in the walls thereof, a finger slidably mounted in each pair of diametrically disposed openings, a sleeve freely movable in the cylinder, means connecting an intermediate portion of each finger to the sleeve so that the fingers will move simultaneously, means connected with the sleeve for compelling said sleeve and fingers to be moved in one direction for projecting one end of each finger from the cylinder, means rotating the cylinder so that the projecting ends of the fingers will pass through the grid and lift the unreleased articles over the cylinder to a discharge point, and a stationary cam at each end of the cylinder and provided with a curved surface adapted to engage the adjacent end of the sleeve for causing said sleeve to contact the inner wall of said cylinder and project the other end of each finger from said cylinder when passing through the grid, said cam having a substantially flat surface upon which the sleeve slides after leaving the curved surface under the influence of the compelling means so that the other ends of the fingers will be maintained in projected relation and pass through the grid.

5. A sorting machine comprising a stationary grid, means feeding articles of various sizes to the grid which will release articles of minimum size, a cylinder having diametrically disposed openings, a finger slidably mounted in the diametrically disposed openings, a sleeve freely movable in the cylinder, means connecting an intermediate portion of each finger to the sleeve so that the fingers will move simultaneously with the sleeve, a resilient means pulling downwardly on the sleeve for forcing the opposite ends of the fingers from said cylinder, means rotating the cylinder and likewise the fingers, means guiding the sleeve so that the opposite ends of the fingers will be alternately projected from the cylinder and pass through the stationary grid and lift the unreleased articles over the cylinder to a discharge point.

6. A sorting machine comprising a stationary grid, means feeding articles of various sizes to the grid which will release articles of minimum size, a cylinder having diametrically disposed groups of openings in the walls thereof, a series of fingers slidably mounted in each group of diametrically disposed openings, a sleeve freely movable in the cylinder, means connecting the fingers to the sleeve so that the fingers will move simultaneously with the sleeve, one series of fingers extending diametrically opposite to the other series, springs pulling downwardly on the sleeve for forcing one series of the fingers from one group of the openings in the cylinder, stationary cams engaged by the sleeve for forcing the sleeve against the inner walls of the cylinder and the other series of the fingers through the other group of openings in said cylinder so that said fingers will pass through the grid, said cams releasing the sleeve to the action of the springs when the last mentioned series of said fingers have passed the upper dead center of their travel for projecting the first mentioned series from the cylinder, and means revolving the cylinder.

7. A sorting machine comprising a stationary grid, means feeding articles of various sizes to the grid which will release articles of minimum size, a cylinder having diametrically disposed pairs of openings in the walls thereof, a finger slidably mounted in each pair of diametrically disposed openings, a sleeve freely movable in the cylinder, means connecting an intermediate portion of each finger to the sleeve so that the fingers will move simultaneously with the sleeve, spaced rollers revolubly supporting the cylinder horizontally, means driving certain of said rollers, springs connected between the sleeve and frame, pulling downwardly on the sleeve, for forcing the downwardly extending ends of the fingers from the cylinder, stationary cams guiding the sleeve against the inner wall of the cylinder for maintaining the projected ends of the fingers extended when the sleeve is being carried upwardly by the rotating cylinder, said cams releasing the sleeve at approximately the upper dead center of rotation of the cylinder.

8. A sorting machine comprising a stationary grid, means feeding articles of various sizes to the grid which will release articles of minimum size, a cylinder having diametrically disposed openings, a finger slidably mounted in each pair of the diametrically disposed openings, a sleeve freely movable in the cylinder, means connecting an intermediate portion of each finger to the sleeve so that the fingers will move simultaneously with the sleeve, a resilient means pulling downwardly on the sleeve for forcing the opposite ends of the fingers from said cylinder, means rotating the cylinder and likewise the fingers, means guiding the sleeve so that the opposite ends of the fingers will be alternately projected from the cylinder and pass through the stationary grid and lift the unreleased articles over the cylinder to a discharge point, a second stationary grid located diametrically opposite the first grid to receive articles discharged from the fingers and cylinder, and to release articles of an intermediate size, said guiding means and resilient means causing the projected ends of the fingers to be drawn into the cylinder before the moving fingers approach the second stationary grid and means for removing articles left on the second grid.

9. A machine for separating materials according to size, comprising a cylinder toward which the materials are directed, a stationary grid which will release materials below a predetermined size, means feeding the materials on to the grid, means causing rotation of the cylinder, said cylinder having diametrically disposed openings, a finger slidably mounted in each pair of the diametrically disposed openings and adapted to have its opposite ends projected alternately from the cylinder, means in the cylinder connecting all of the fingers for simultaneous movement, stationary means acting on the last-mentioned means for forcing one group of the ends of the fingers from the cylinder, while the opposite ends are housed in the adjacent openings, so that the projected ends of the fingers will be revolved upwardly through the materials remaining on the stationary grid and move the materials, resilient means acting on the finger-connecting means for causing said fingers to be moved downwardly through the cylinder for projecting the housed ends of the fingers from said cylinder, when said cylinder has rotated the projected ends of the fingers past the upper dead center, and means for removing the separated materials from the cylinder after the projected ends of the fingers have been retracted to housed positions in the adjacent openings.

E. R. SANDMEYER.